United States Patent
Karanam et al.

(10) Patent No.: US 10,169,418 B2
(45) Date of Patent: Jan. 1, 2019

(54) DERIVING A MULTI-PASS MATCHING ALGORITHM FOR DATA DE-DUPLICATION

(71) Applicant: International Business Machines Corporation, Armonk, NY (US)

(72) Inventors: Hima P. Karanam, New Delhi (IN); Albert Maier, Tuebingen (DE); Marvin Mendelssohn, Cambridge, MA (US); Heather Stimpson, Cambridge, MA (US); Dan Dan Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 14/494,875

(22) Filed: Sep. 24, 2014

(65) Prior Publication Data

US 2016/0085807 A1     Mar. 24, 2016

(51) Int. Cl.
*G06F 17/30* (2006.01)
(52) U.S. Cl.
CPC .............................. *G06F 17/30489* (2013.01)
(58) Field of Classification Search
CPC ................................................ G06F 17/30489
See application file for complete search history.

(56) References Cited

U.S. PATENT DOCUMENTS

| | | | | |
|---|---|---|---|---|
| 5,819,291 A * | 10/1998 | Haimowitz | ....... | G06F 17/30949 |
| 6,370,547 B1 * | 4/2002 | Eftink | ..................... | G06F 13/28 |
| | | | | 707/783 |
| 6,523,019 B1 * | 2/2003 | Borthwick | ........... | G06N 99/005 |
| | | | | 706/45 |
| 7,152,060 B2 * | 12/2006 | Borthwick | ........ | G06F 17/30495 |
| | | | | 707/770 |
| 7,634,464 B2 | 12/2009 | Chen et al. | | |
| 7,899,796 B1 * | 3/2011 | Borthwick | ........ | G06F 17/30489 |
| | | | | 707/692 |

(Continued)

OTHER PUBLICATIONS

Prasad et al., Automated Selection of Blocking Columns for Record Linkage, 2012, IEE 10.1109/SOLI.2012.6273508.*

(Continued)

*Primary Examiner* — Mark D Featherstone
*Assistant Examiner* — Faezeh Forouharnejad
(74) *Attorney, Agent, or Firm* — Ryan, Mason & Lewis, LLP

(57) ABSTRACT

Methods, systems, and computer program products for deriving a multi-pass matching algorithm for data de-duplication are provided herein. A method includes identifying multiple passes across multiple databases using a set of one or more blocking columns derived from a set of trained input data; identifying, in each of the multiple passes, one or more columns across the multiple databases that match one or more of the blocking columns; selecting a given pass from the multiple passes, wherein said given pass comprises a maximum number of matching columns within the multiple passes; determining, for the given pass, data that conform to the given pass comprising (i) a set of matching columns, (ii) one or more matching types and (iii) one or more weights; and determining one or more subsequent passes across the multiple databases iteratively by removing the data that conform to the given pass.

18 Claims, 4 Drawing Sheets

(56) References Cited

U.S. PATENT DOCUMENTS

| | | | | |
|---|---|---|---|---|
| 8,032,546 B2* | 10/2011 | Arasu | ............... | G06F 17/30569 |
| | | | | 707/769 |
| 8,370,372 B2* | 2/2013 | Jones | ............... | G06F 17/30864 |
| | | | | 707/706 |
| 8,843,492 B2* | 9/2014 | Cao | .................... | G06F 17/30303 |
| | | | | 707/737 |
| 2003/0126144 A1* | 7/2003 | O'Halloran | ....... | G06F 17/30398 |
| 2004/0019593 A1* | 1/2004 | Borthwick | ........ | G06F 17/30495 |
| 2007/0174277 A1* | 7/2007 | Giang | ............... | G06F 17/30489 |
| 2008/0077573 A1* | 3/2008 | Weinberg | .......... | G06F 17/30495 |
| 2008/0270110 A1* | 10/2008 | Yurick | ............. | G06F 17/30026 |
| | | | | 704/3 |
| 2010/0094910 A1* | 4/2010 | Bayliss | .................. | G06Q 10/10 |
| | | | | 707/800 |
| 2010/0169348 A1* | 7/2010 | Maro | ................ | G06F 17/30489 |
| | | | | 707/758 |
| 2012/0059853 A1* | 3/2012 | Jagota | ............... | G06F 17/30241 |
| | | | | 707/780 |
| 2013/0159285 A1* | 6/2013 | Dees | ................. | G06F 17/30466 |
| | | | | 707/718 |
| 2014/0330845 A1* | 11/2014 | Feldschuh | ......... | G06F 17/30303 |
| | | | | 707/749 |
| 2016/0078070 A1* | 3/2016 | Tran | .................. | G06F 17/30292 |
| | | | | 707/600 |

OTHER PUBLICATIONS

ISELE, Learning Expressive Linkage Rules for Entity Matching using Genetic Programming, Universitat Mannheim, Jun. 2013, https://ub-madoc.bib.uni-mannheim.de/33418/1/Isele_Dissertation.pdf.

* cited by examiner

DERIVING A MULTI-PASS MATCHING ALGORITHM FOR DATA DE-DUPLICATION

FIELD OF THE INVENTION

Embodiments of the invention generally relate to information technology, and, more particularly, to data management techniques.

BACKGROUND

Enterprises commonly accumulate large amounts of data, such as customer data, product description data, etc. Commonly, such data are accumulated by various departments and/or groups within the enterprise, wherein each department and/or group maintains a separate database. As a result, there can exist a non-trivial amount of duplicate records in the data within and across databases in an enterprise.

Moreover, in many instances, such duplicates records are not linked. For example, a person might have mobile and broadband connections from the same enterprise, but the enterprise is unaware of this because of a lack of linking of appropriate records within and across various databases.

Consequently, de-duplication is important for enterprises interested in a single view of its customer data to provide more efficient services and more efficient customer data management. However, considerable human effort is required to manually analyze individual columns of data to implement a matching rule. Accordingly, a need exists for techniques to derive a multi-pass matching algorithm that implements blocking and matching steps.

SUMMARY

In one aspect of the present invention, techniques for deriving a multi-pass matching algorithm for data de-duplication are provided. An exemplary computer-implemented method can include steps of identifying multiple passes across multiple databases using a set of one or more blocking columns derived from a set of trained input data; identifying, in each of the multiple passes, one or more columns across the multiple databases that match one or more of the blocking columns; selecting a given pass from the multiple passes, wherein said given pass comprises a maximum number of matching columns within the multiple passes; determining, for the given pass, data that conform to the given pass comprising (i) a set of matching columns, (ii) one or more matching types and (iii) one or more weights; and determining one or more subsequent passes across the multiple databases iteratively by removing the data that conform to the given pass.

In another aspect of the invention, an exemplary computer-implemented method can include steps of training a set of sample data to identify matches among a given set of records within the set of sample data; identifying (i) multiple candidate passes and (ii) one or more blocking columns for each of the multiple candidate passes within the trained set of sample data; selecting a given pass from the multiple candidate passes, wherein said given pass comprises a maximum number of matches among the given set of records; and determining, for the given pass, a second set of data that comprises (i) a set of matching columns, (ii) one or more matching types and (iii) one or more weights. The method also includes executing the given pass with the second set of data; removing each item of the second set of data from the given pass that matches an item of data from the trained set of sample data and identifying a subsequent pass based on the remaining data from the second set of data; iterating said selecting, said executing, and said removing until a predetermined amount of the second set of data matches an item of data from the trained set of sample data to determine a multi-pass matching algorithm; and outputting the multi-pass matching algorithm.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps.

Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
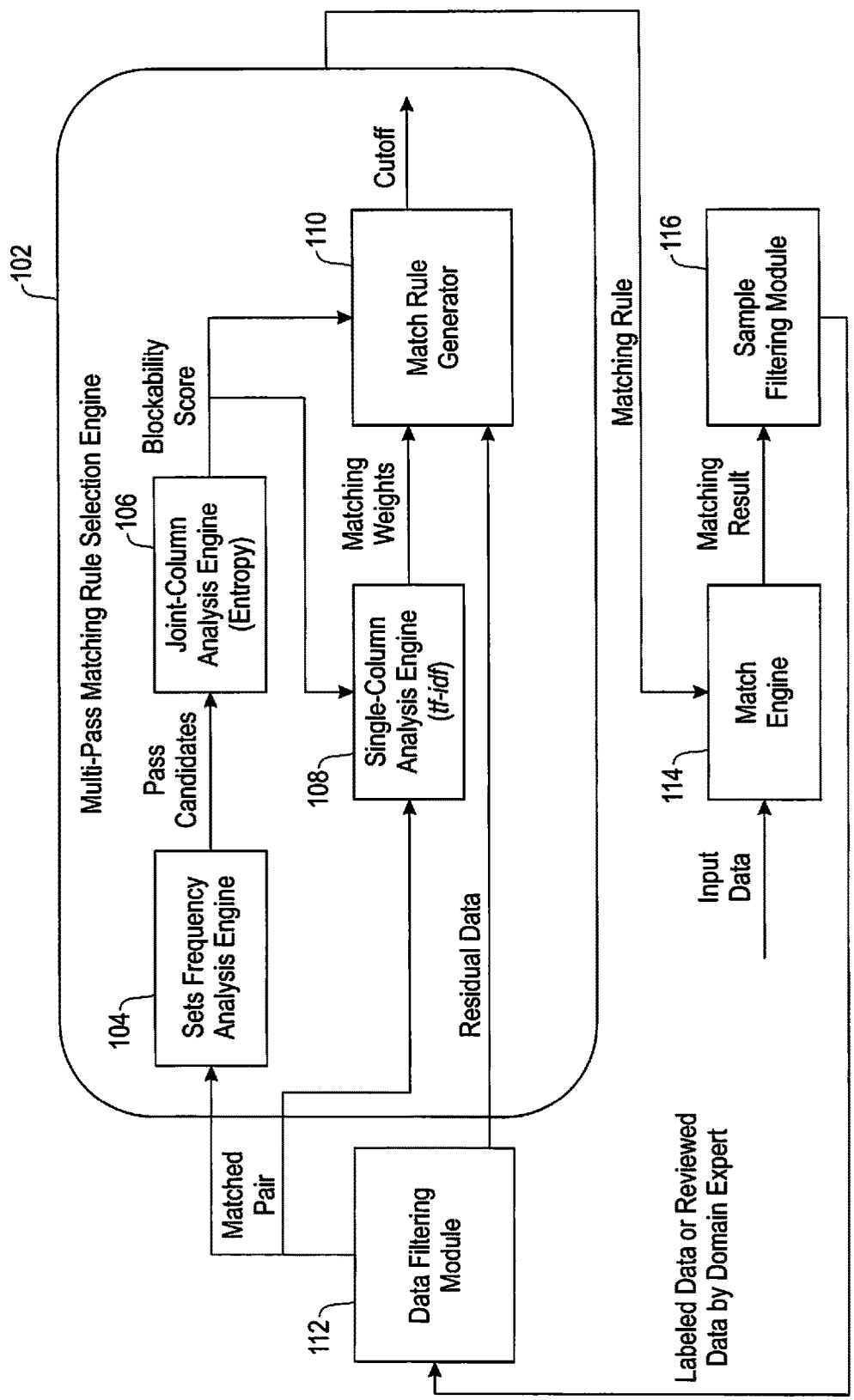
FIG. 1 is a diagram illustrating example system architecture, according to an embodiment of the invention.

As described herein, an aspect of the present invention includes techniques for deriving a multi-pass matching algorithm. For instance, at least one embodiment of the invention includes utilizing training examples wherein users have marked matches in a given input file to derive multiple passes that can be identified from the data. As used herein, a pass includes a matching algorithm, which includes a set of blocking columns for filtering data and a set of matching columns on which match criteria are defined. One or more embodiments of the invention include determining the attributes that are to be used for matching as well as the matching types and weights to associate with each attribute. In one example embodiment of the invention, the algorithm is iteratively prepared and run against a matching engine to obtain results, and such results are compared to human-derived results to modify the current pass.

Once a single pass is identified, the data corresponding to that pass can be removed and the next best pass for the remaining data can be iteratively derived. Such an example embodiment of the invention can include iterating to derive the algorithm until a given percentage of human matches are achieved by the algorithm and/or a certain percent of the input data has been tested.

Additionally, in at least one embodiment of the invention, the derived multi-pass matching algorithm is based on training data for de-duplicating data as well as multi-pass rules. Training data can be obtained, for example, from domain experts. One or more embodiments of the invention can include an additional column referred to herein as setID, which describes all of the records that are duplicates of each other and that will have the same set identifier (ID). All other attributes remain as they would for a dataset that is being de-duplicated or matched. For example, in the case of person-record matching, a name, an address, a phone number, an email address, etc., can be included as a set of attributes, and an additional setID attribute is added which provides information on which all records are duplicates of each other. Such training data can be obtained, for example, from the domain expert for a given data set under consideration for de-duplication.

The multi-pass rules can be determined, for example, based on the identification of blocking and/or matching columns in the data. Further, the multi-pass rules facilitate selection of a pass which matches a maximum number of records, as well as determination of the cutoff point(s) for the selected pass. An example blocking set in the case of person-record matching can include city, state, country or last name and city. Each of these attributes can act as a blocking column, which is generally identified as a column that reduces the search space for matching.

As detailed herein, execution of one or more embodiments of the invention can result in a considerable reduction in the amount of human effort required in generating matching rules by automatically analyzing training data. Also, one or more embodiments of the invention can be implemented within frameworks such as, for example, Quality Stage, and can additionally incorporate domain expertise by allowing a human user to select an appropriate matching rule based on suggestions and/or related statistical outputs and visualizations generated by an embodiment of the invention.

FIG. 1 is a diagram illustrating example system architecture, according to an embodiment of the invention. By way of illustration, FIG. 1 depicts a multi-pass matching rule selection engine 102, a data filtering module 112, a match engine 114 and a sample filtering module 116. The multi-pass matching rule selection engine 102 includes a sets frequency analysis engine 104, a joint-column analysis engine 106, a single-column analysis engine 108, and a match rule generator 110.

In at least one embodiment of the invention, the data filtering module 112 interacts with a domain expert to filter and tag the training data for learning a multi-pass matching algorithm. The output of module 112 includes input data for engine 102 with a setID column added (which, as noted, depicts which records are duplicates). Accordingly, two or more records having the same setID are duplicates of each other. These data are provided to both the sets frequency analysis engine 104 and the single-column analysis engine 108 to identify blocking and matching criteria, respectively. The sets frequency analysis engine 104 identifies potential blocking columns and passes that information to the joint-column analysis engine 106, which processes the potential blocking columns and produces a set of blocking columns that best fit the data.

This output is provided to the single-column analysis engine 108, which excludes blocking columns and identifies a set of matching attributes and the matching criteria for the given set of blocking columns. Accordingly, in one or more embodiments of the invention, the single-column analysis engine 108 produces match criteria and weights to be used for each attribute that is used as a matching attribute for the current pass. The match rule generator 110 takes output from the joint-column analysis engine 106 and the single-column analysis engine 108 to produce a matching specification for a given pass (also referred to herein as a pass definition). This matching specification is sent to the matching engine 114, which takes the original input data (without setIDs) and produces the match results. These data are then provided to the sample filtering engine 116, which removes all of the matches derived from this pass from the training data, and outputs the remaining training data for identification of the next pass. This sequence of actions continues until a pre-defined percentage of training data remains, at which point, the multi-pass matching algorithm is generated and/or output.

Figure 2:
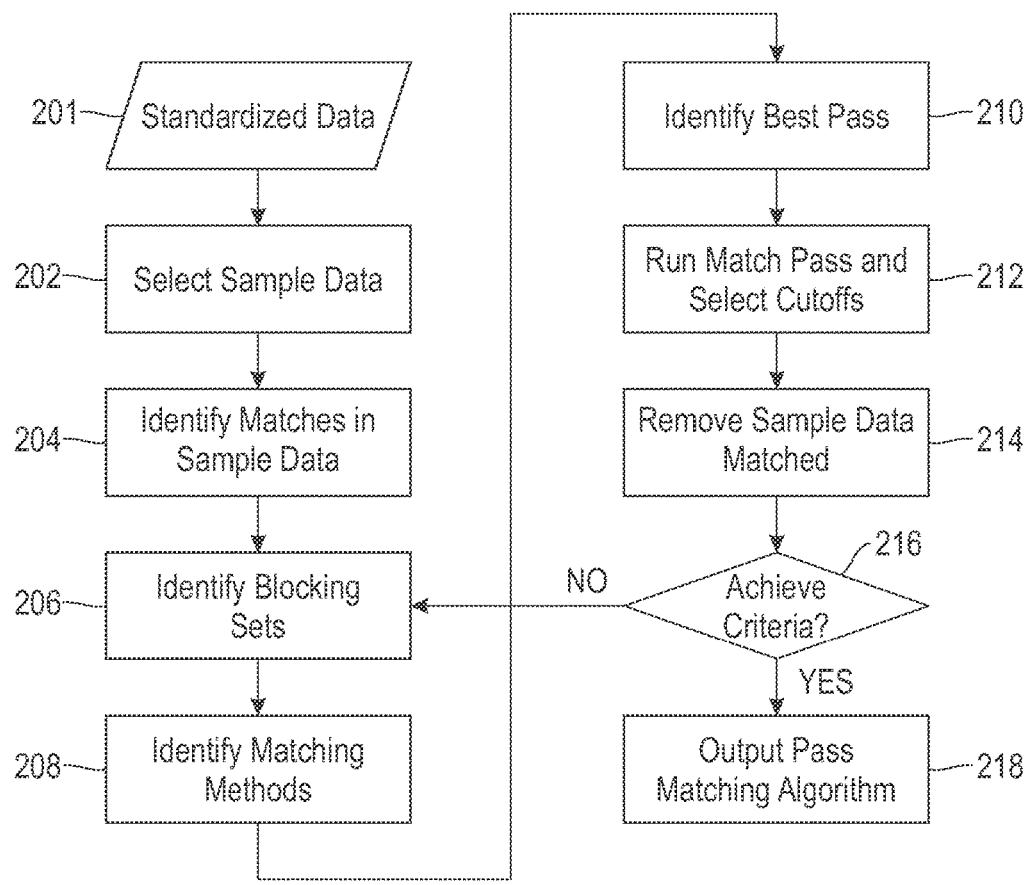
FIG. 2 is a flow diagram illustrating an example embodiment, according to an aspect of the invention.

FIG. 2 is a flow diagram illustrating an example embodiment, according to an aspect of the invention. With an input of standardized data 201, step 202 includes selecting sample data and step 204 includes identifying matches in the sample data. Sample data can be selected, for example, based on a frequency analysis, and such data are presented to the user for flagging (or other form of annotation). An example embodiment of the invention includes an input of standardized data (such as 201 in FIG. 2) in a tabular format, and an output of training data marked with flags for matched record sets and unmatched records.

By way of specific example, consider the following. For a single column, C, record sets with count (value) ≥2 are selected at random. Additionally, a user can annotate sample data with one or more setIDs, as described above, and flag matched record sets and unmatched records.

Step 206 includes identifying blocking sets and outputting the set of possible blocking columns analyzing the data. An example embodiment of the invention includes an input of training data with flags indicating matched records, and an output of characteristics of sets in tabular form and multiple passes candidates. Such characteristics can include, for example, data distribution, the number of unique values present, the entropy of a column, etc. In an example embodiment of the invention, a combination of such characteristics can be used in deciding which columns are to be used for blocking. For example, a city may be a better blocking column than a country if using data from a single country.

Identifying blocking sets includes making a comparison to determine if two values are the same for each column in the same set. If two or more columns are being used in a blocking set, and if those columns and filter data that have the same values for the selected blocking columns are combined, it is preferable to have the maximum coverage of setIDs in that block. For a single column, C, the single set is the first set. If two values in C are the same (or similar beyond a specified threshold), this column is set as 1, whereas if the two values are different, this column is set as 0. Additionally, at least one embodiment includes grouping data by flag to determine a count of flags, as well as to sort the data by flag frequency. Flagging can be carried out for each setID on each column to determine blocking columns.

Step 208 includes identifying matching methods, which includes identifying matching types for a given pass. Such matching types are determined by passing sample data to different matching types and identifying weights associated therewith. At least one embodiment of the invention includes using a pre-defined set of matching types for different columns to determine which matching type maximizes the number records matching for that particular column from the given training data set. This match type assignment can be done for all matching columns. After the weights are assigned, data statistics (such as, for example, term frequency-inverse document frequency (tf-idf)) pertaining to the importance of that column in determining matches are implemented. Additionally, after the assignment, data are passed to a matching engine and the weights are refined if the output matches are not to an expected level of quality.

Step 210 includes identifying the best match pass, and step 212 includes running the best match pass and selecting one or more cut-offs. Accordingly, at least one embodiment of the invention includes converting the first pass into matching algorithms, determining matching scores and setting the cut-offs in a way to match given human matching results. Generally, score distributions are used in defining the match cut-offs along with training data. For each matched record pair, there is a composite score that is computed based on the weights given for the matching attributes. If the composite score combined from all of the attributes surpasses a certain threshold, then the pair is declared a match. Suppose, by way of example, three points are obtained from name-matching, seven points from address-matching, and two points from email-matching; the match cut-off could be a maximum of 12. If approximate matching is considered, then the match cut-off could be set to ten, for example. Score distribution along with training data are used in determining such cut-offs.

Additionally, if the results do not satisfy the human-generated matches, the weight thresholds can be adjusted for each match column to re-generate the scores and cut-offs. Also, this step can be repeated to obtain a desired level of agreement with human-generated results (wherein a human filters the data to assign setIDs, as detailed above).

Accordingly, step 214 includes removing matched data from the sample data, and step 216 includes determining whether given criteria were achieved. Such criteria can include, for example, the percentage of matches from the training data. For instance, assume that a stopping point will be reached upon the achievement of more than 90% matching results from a human generated set, and the matching algorithm can be provided to an expert for further refinement. If the given criteria were not achieved, then the sequence returns to step 206, and steps 206 through 214 are repeated, wherein the weight thresholds and cut-offs can be adjusted for the subsequent pass(es). As noted above, this sequence of steps can be repeated until a desired level of agreement with human-generated results is achieved.

If the given criteria were achieved (as determined in step 216), then the sequence continues to step 218, which includes outputting the pass matching algorithm. In at least one embodiment of the invention, matching algorithm specifications can be output, wherein the specifications can subsequently be converted to an appropriate or desired format that a match engine can readily consume. Additionally, a user can also make modifications to the automatically produced matching algorithm specifications.

Figure 3:
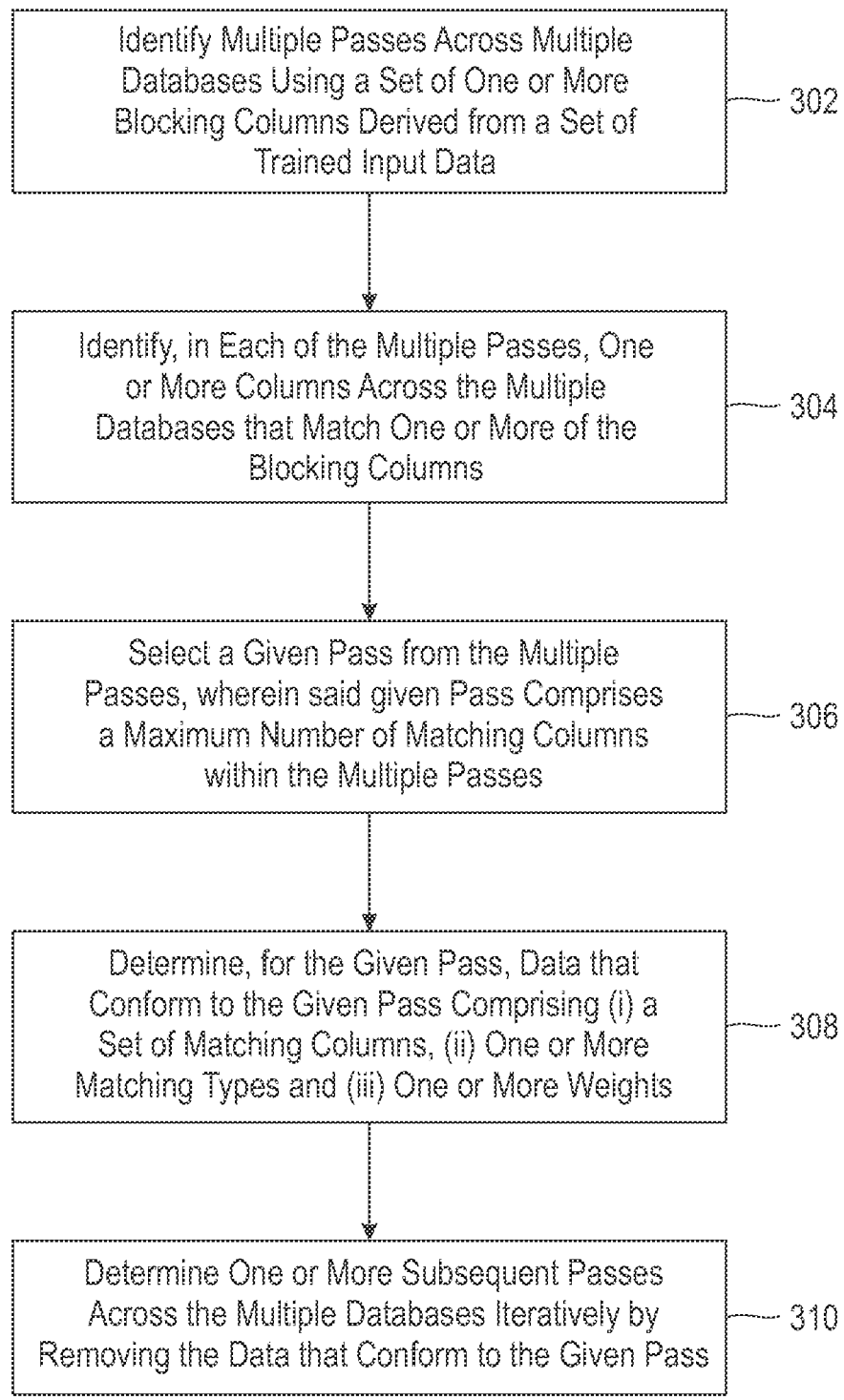
FIG. 3 is a flow diagram illustrating techniques according to an embodiment of the invention.

FIG. 3 is a flow diagram illustrating techniques according to an embodiment of the present invention. Step 302 includes identifying multiple passes across multiple databases using a set of one or more blocking columns derived from a set of trained input data. In at least one embodiment of the invention, the set of trained input data can include data identifying user-annotated matching columns.

Step 304 includes identifying, in each of the multiple passes, one or more columns across the multiple databases that match one or more of the blocking columns. Step 306 includes selecting a given pass from the multiple passes, wherein said given pass comprises a maximum number of matching columns within the multiple passes. At least one embodiment of the invention can also include determining a cut-off point for the given pass.

Step 308 includes determining, for the given pass, data that conform to the given pass comprising (i) a set of matching columns, (ii) one or more matching types and (iii) one or more weights. The one or more matching types are used in identifying the one or more columns across the multiple databases that match one or more of the blocking columns. For example, a first name can be matched using an edit distance or phonetic matching, whereas a last name may utilize an exact equality match. Also, the one or more weights are assigned to each of the one or more columns across the multiple databases that match one or more of the blocking columns.

As detailed herein, for a selected pass, a set of matching functions are identified from the attributes that are not in the blocking column list. The matching functions are tuned to produce a matching specification for that pass so that all of the training records in that pass are matched using the assigned matching functions. Each pass will have a set of blocking columns and a set of matching functions, which operate on different attributes.

Step 310 includes determining one or more subsequent passes across the multiple databases iteratively by removing the data that conform to the given pass.

The techniques depicted in FIG. 3 can also include determining one or more attributes to be used in said identifying the one or more columns across the multiple databases that match one or more of the blocking columns, as well as determining a weight to associate with each of the one or more attributes. Additionally, at least one embodiment of the invention includes determining one or more matching types to be used in said identifying the one or more columns across the multiple databases that match one or more of the blocking columns.

Also, the techniques depicted in FIG. 3 can include comparing results derived from (i) the given pass and (ii) the one or more subsequent passes to human-derived results, as well as modifying one or more of the passes based on said comparing. Further, at least one embodiment of the invention includes assigning the one or more weights to each of the one or more columns across the multiple databases that match one or more of the blocking columns.

Additionally, the techniques depicted in FIG. 3 can also include outputting (i) the given pass and (ii) the one or more subsequent passes as a set of multi-pass matching algorithms, wherein each pass comprises a single algorithm that includes corresponding blocking and matching criteria.

Further, at least one embodiment of the invention includes techniques that include training a set of sample data to identify matches among a given set of records within the set of sample data, identifying (i) multiple candidate passes and (ii) one or more blocking columns for each of the multiple candidate passes within the trained set of sample data, and selecting a given pass from the multiple candidate passes, wherein said given pass comprises a maximum number of matches among the given set of records. Such an embodiment additionally includes determining, for the given pass, a second set of data that comprises (i) a set of matching columns, (ii) one or more matching types and (iii) one or more weights (that are assigned to each of the matches among the given set of records), executing the given pass with the second set of data, removing each item of the second set of data from the given pass that matches an item of data from the trained set of sample data, and identifying a subsequent pass based on the remaining data from the second set of data. Further, such an embodiment includes iterating said selecting, said executing, and said removing until a predetermined amount of the second set of data matches an item of data from the trained set of sample data to determine a multi-pass matching algorithm, and outputting the multi-pass matching algorithm.

Such an embodiment also includes assigning a weight to each of the matches among the given set of records, as well as determining a cut-off point for the given pass. Additionally, such an embodiment can further include identifying the set of sample data from a set of standardized data, as well as identifying one or more matching methods to be applied for one or more non-blocking attributes in each of the multiple candidate passes.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
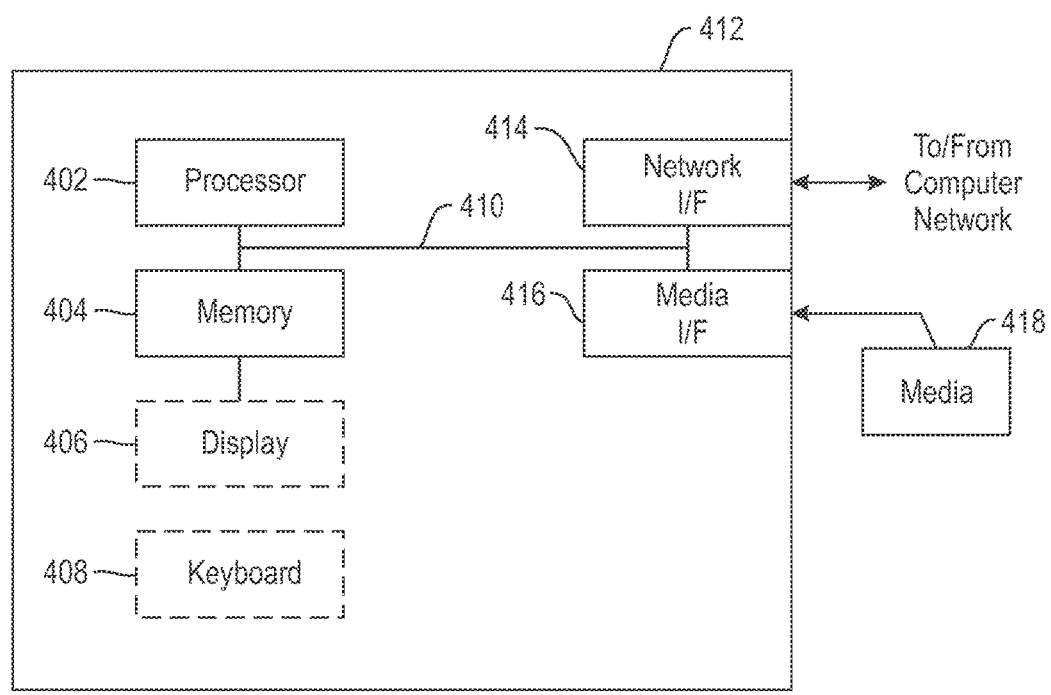
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, deriving a multi-pass matching algorithm from training data by iteratively removing matched data from each pass.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising steps of:
   (a) identifying multiple passes across multiple databases using a set of one or more blocking columns derived from a set of trained input data within which users have marked matches, wherein each of the passes comprises a matching algorithm that includes (i) a set of blocking columns for filtering data and (ii) a set of matching columns on which match criteria are defined;
   (b) identifying, in each of the multiple passes, one or more columns across the multiple databases that match one or more of the blocking columns;
   (c) selecting a given pass from the multiple passes, wherein said given pass comprises a maximum number of matching columns within the multiple passes;
   (d) determining, for the given pass, data that conform to the given pass comprising (i) a set of matching columns, (ii) one or more matching types and (iii) one or more weights, wherein the one or more weights are assigned to each of the one or more columns across the multiple databases that match one or more of the blocking columns;
   (e) executing the matching algorithm of the given pass against a matching engine to obtain results;
   (f) comparing the results to human-derived results;
   (g) removing the data that conform to the given pass;
   (h) determining one or more subsequent passes across the multiple databases subsequent to said removing;
   (i) iterating steps (c) through (h) until a final matching algorithm is derived, wherein the final matching algorithm achieves a given percentage of human matches in step (f) and a given percentage of the trained input data has been utilized; and
   (j) outputting the final matching algorithm to at least one user;
   wherein the steps are carried out by at least one computing device.

2. The method of claim 1, wherein said set of trained input data comprises data identifying user-annotated matching columns.

3. The method of claim 1, comprising:
   determining one or more attributes to be used in said identifying the one or more columns across the multiple databases that match one or more of the blocking columns.

4. The method of claim 3, comprising:
   determining the one or more weights to associate with each of the one or more attributes.

5. The method of claim 1, wherein the one or more matching types are used in identifying the one or more columns across the multiple databases that match one or more of the blocking columns.

6. The method of claim 1, comprising:
   modifying (i) the given pass and/or (ii) at least one of the one or more subsequent passes based on said comparing.

7. The method of claim 1, comprising:
   determining a cut-off point for the given pass.

8. The method of claim 1, comprising:
   outputting (i) the given pass and (ii) the one or more subsequent passes as a set of multi-pass matching algorithms, wherein each pass comprises a single algorithm that includes corresponding blocking and matching criteria.

9. A computer program product, the computer program product comprising a computer readable storage medium having program instructions embodied therewith, the program instructions executable by a computing device to cause the computing device to:
   (a) identify multiple passes across multiple databases using a set of one or more blocking columns derived from a set of trained input data within which users have marked matches, wherein each of the passes comprises a matching algorithm that includes (i) a set of blocking columns for filtering data and (ii) a set of matching columns on which match criteria are defined;
   (b) identify, in each of the multiple passes, one or more columns across the multiple databases that match one or more of the blocking columns;
   (c) select a given pass from the multiple passes, wherein said given pass comprises a maximum number of matching columns within the multiple passes;
   (d) determine, for the given pass, data that conform to the given pass comprising (i) a set of matching columns, (ii) one or more matching types and (iii) one or more weights, wherein the one or more weights are assigned to each of the one or more columns across the multiple databases that match one or more of the blocking columns;
   (e) execute the matching algorithm of the given pass against a matching engine to obtain results;
   (f) compare the results to human-derived results;
   (g) remove the data that conform to the given pass;
   (h) determine one or more subsequent passes across the multiple databases subsequent to said removing;
   (i) iterate steps (c) through (h) until a final matching algorithm is derived, wherein the final matching algorithm achieves a given percentage of human matches in step (f) and a given percentage of the trained input data has been utilized; and
   (j) output the final matching algorithm to at least one user.

10. The computer program product of claim 9, wherein the one or more weights are assigned to each of the one or more columns across the multiple databases that match one or more of the blocking columns.

11. The computer program product of claim 9, wherein the program instructions executable by a computing device further cause the computing device to:
determine a cut-off point for the given pass.

12. The computer program product of claim 9, wherein the program instructions executable by a computing device further cause the computing device to:
output (i) the given pass and (ii) the one or more subsequent passes as a set of multi-pass matching algorithms, wherein each pass comprises a single algorithm that includes corresponding blocking and matching criteria.

13. A system comprising:
a memory; and
at least one processor coupled to the memory and configured for:
 (a) identifying multiple passes across multiple databases using a set of one or more blocking columns derived from a set of trained input data within which users have marked matches, wherein each of the passes comprises a matching algorithm that includes (i) a set of blocking columns for filtering data and (ii) a set of matching columns on which match criteria are defined;
 (b) identifying, in each of the multiple passes, one or more columns across the multiple databases that match one or more of the blocking columns;
 (c) selecting a given pass from the multiple passes, wherein said given pass comprises a maximum number of matching columns within the multiple passes;
 (d) determining, for the given pass, data that conform to the given pass comprising (i) a set of matching columns, (ii) one or more matching types and (iii) one or more weights, wherein the one or more weights are assigned to each of the one or more columns across the multiple databases that match one or more of the blocking columns;
 (e) executing the matching algorithm of the given pass against a matching engine to obtain results;
 (f) comparing the results to human-derived results;
 (g) removing the data that conform to the given pass;
 (h) determining one or more subsequent passes across the multiple databases subsequent to said removing;
 (i) iterating steps (c) through (h) until a final matching algorithm is derived, wherein the final matching algorithm achieves a given percentage of human matches in step (f) and a given percentage of the trained input data has been utilized; and
 (j) outputting the final matching algorithm to at least one user.

14. A method comprising steps of:
 (a) training a set of sample data to identify matches among a given set of records within the set of sample data;
 (b) identifying (i) multiple candidate passes and (ii) one or more blocking columns for each of the multiple candidate passes within the trained set of sample data, wherein each of the passes comprises a matching algorithm that includes (i) a set of blocking columns for filtering data and (ii) a set of matching columns on which match criteria are defined;
 (c) selecting a given pass from the multiple candidate passes, wherein said given pass comprises a maximum number of matches among the given set of records;
 (d) determining, for the given pass, a second set of data that comprises (i) a set of matching columns, (ii) one or more matching types and (iii) one or more weights;
 (e) executing the matching algorithm of the given pass with the second set of data against a matching engine to obtain results;
 (f) comparing the results to human-derived results;
 (g) removing each item of the second set of data from the given pass that matches an item of data from the trained set of sample data;
 (h) identifying a subsequent pass based on the remaining data from the second set of data;
 (i) iterating steps (c) through (h) until a multi-pass matching algorithm is derived, wherein the multi-pass matching algorithm achieves a given percentage of human matches in step (f) and a given percentage of the trained set of sample data has been utilized; and
 (j) outputting the multi-pass matching algorithm to at least one user;
wherein the steps are carried out by at least one computing device.

15. The method of claim 14, wherein the one or more weights are assigned to each of the matches among the given set of records.

16. The method of claim 14, comprising:
determining a cut-off point for the given pass.

17. The method of claim 14, comprising:
identifying the set of sample data from a set of standardized data.

18. The method of claim 14, comprising:
identifying one or more matching methods to be applied for one or more non-blocking attributes in each of the multiple candidate passes.

* * * * *